(No Model.) 6 Sheets—Sheet 1.

J. A. WOODBURY, J. MERRILL, G. PATTEN & E. F. WOODBURY.
AIR ENGINE.

No. 331,361. Patented Dec. 1, 1885.

Fig. 1.

Witnesses:
Walter E. Lombard
Frank O. Pray

Inventors:
James A. Woodbury,
Joshua Merrill,
George Patten,
Edward F. Woodbury,
by N. C. Lombard
Attorney.

Fig. 2.

(No Model.) 6 Sheets—Sheet 3.
J. A. WOODBURY, J. MERRILL, G. PATTEN & E. F. WOODBURY.
AIR ENGINE.

No. 331,361. Patented Dec. 1, 1885.

Fig. 5.

Witnesses:
Walter E. Lombard.
Frank E. Pray.

Inventors:
James A. Woodbury,
Joshua Merrill,
George Patten,
Edward F. Woodbury,
by N. C. Lombard
Attorney.

(No Model.) 6 Sheets—Sheet 4.

J. A. WOODBURY, J. MERRILL, G. PATTEN & E. F. WOODBURY.
AIR ENGINE.

No. 331,361. Patented Dec. 1, 1885.

Witnesses:
Walter E. Lombard
Frank E. Gray

Inventors:
James A. Woodbury,
Joshua Merrill,
George Patten,
Edward F. Woodbury,
by N. C. Lombard
Attorney.

(No Model.) 6 Sheets—Sheet 6.

J. A. WOODBURY, J. MERRILL, G. PATTEN & E. F. WOODBURY.
AIR ENGINE.

No. 331,361. Patented Dec. 1, 1885.

Witnesses:
Walter E. Lombard
Frank O. Pray

Inventors:
James A. Woodbury,
Joshua Merrill,
George Patten,
Edward F. Woodbury,
by N. C. Lombard
Attorney.

UNITED STATES PATENT OFFICE.

JAMES A. WOODBURY, OF WINCHESTER, AND JOSHUA MERRILL, GEORGE PATTEN, AND EDWARD F. WOODBURY, OF BOSTON, MASSACHUSETTS.

AIR-ENGINE.

SPECIFICATION forming part of Letters Patent No. 331,361, dated December 1, 1885.

Application filed April 13, 1885. Serial No. 162,040. (No model.)

*To all whom it may concern:*

Be it known that we, JAMES A. WOODBURY, of Winchester, in the county of Middlesex and State of Massachusetts, and JOSHUA MERRILL, GEORGE PATTEN, and EDWARD F. WOODBURY, all of Boston, in the county of Suffolk and State of Massachusetts, have invented, jointly, new and useful Improvements in Air-Engines, of which the following, taken in connection with the accompanying drawings, is a specification.

Our invention relates to air-engines in general and to that particular class of such engines in which compressed air is used and the same body of air is alternately heated and cooled and used over and over again without exhausting the same; and it consists in certain novel constructions, arrangements, and combinations of parts, which will be readily understood by reference to the description of the drawings and to the claims to be hereinafter given.

Fig. 3 is a transverse vertical sectional elevation, the cutting-plane being on line $x$ $x$ on Fig. 1. Figs. 4 to 28, inclusive, are drawn to an enlarged scale.

In the drawings, A A are a series of hollow beams, which, together with the plates A' A' A', by which they are connected together, constitute the bed-plate of the engine, upon which are erected the furnace-casings B B' and the secondary or working-cylinder furnace-casings C and C', arranged relatively to each other substantially as described in another application of ours, filed May 16, 1883, and numbered 95,078, upon which our present invention is an improvement. Each of the casings B and B' is provided at its rear with the downwardly-inclined tube or nozzle B², which is connected by the hoop or band $a$ with a corresponding upwardly-inclined tube or nozzle, C², opening from the side of the casing C or C' which is toward the casing B or B' in such a manner as to form a cylindrical passage connecting the upper part of the interior of the casing B or B', as the case may be, with the chamber within the casing C or C', said passage being lined with fire-brick, B³, as shown in Fig. 3.

D and D' are the working-cylinders mounted upon the casings C and C', and connected together at their upper ends by the beam-stand E in bearings, in which is mounted the beam F, to each end of which is connected by a link or connecting-rod, F', and piston-rod F² one of the working-pistons G in substantially the same manner as in said prior application.

H and H' are the regenerator-cylinders, bolted to the upper ends of the furnace-casings B and B', and each having bolted to its lower end a heater, H², and to its upper end a cooler-casing, I or I', and the upper section, J, of a displacer-cylinder, the lower section, J', of which is suspended upon the regenerator-cylinder H or H'. The cooler-casings I and I' are connected together by and support the beam stand K in bearings, in which is mounted the beam K', connected at each end by the link or connecting-rod K² and piston-rod K³ with one of the displacer-pistons L.

M is a shaft provided with two cranks, M' and M², and having mounted thereon the fly-wheel M³, the eccentric M⁴, and the flanged pulley b, said shaft being mounted in bearings in the pedestals N and N', firmly bolted to the bed-plate and stayed at their upper ends by the tie-girts N² and N³, respectively, to the working-cylinder D' and the furnace-casing B'.

The furnace-casings B and B' are each provided with a fire-door, B⁴, and ash-pit door B⁵, and the working-cylinder furnace-casings C and C' are each provided with the discharge-orifice C³, from which a suitable smoke-pipe (not shown) leads to the chimney, (also not shown.)

Figure 2:
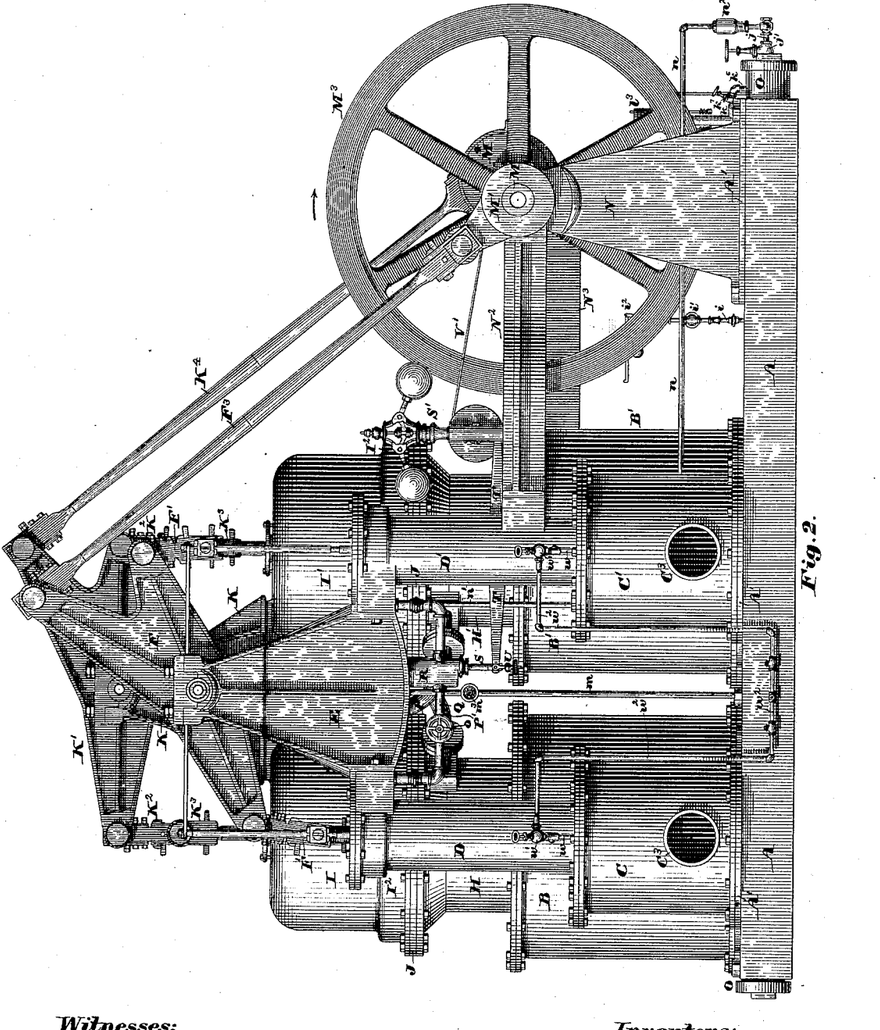
Fig. 2 is a rear side elevation of the same.

So far as described the construction and arrangement of the parts are substantially the same as described in said above-cited prior application, except the construction of the bed-plate and the construction and arrangement of the passages leading from the interiors of the casings B and B' to the interiors of the casings C and C'. The beams F and K' are each provided with a third arm, the movable ends of which are connected by means of the connecting-rods F³ and K⁴, respectively, to the cranks M' and M², as shown in Fig. 2. The furnace-casings B and B' have fitted therein fire-brick linings B⁶, and each is provided with an inner lining or fire-pot, B⁷, of fire-brick, having an inner diameter somewhat less than the diameter of the heater H², and a height equal to about two-thirds the distance from the bottom of the furnace to the under edge of the heater, and detached or separate from the main lining B⁶, so that it may be removed when burned out and a new one put in its place without disturbing said main lining B⁶. The casings C and C' are also lined with fire-brick, C⁴, in a well-known manner. The chambers inclosed by the cooler-casings I and I' are each provided with a large number of bent tubes, c c, which connect the annular regenerator-space between the regenerator-cylinder H or H' and the lower section, J', of the displacer-cylinder with the chamber of the reverser-cylinder above the displacer-piston, substantially as shown and described in said prior application. The lower section of the displacer-cylinder, instead of being supported by three or four lugs projecting radially therefrom and resting upon seats formed for the purpose in the upper end of the regenerator-cylinder, as in said prior application, has formed upon its upper end an outwardly-projecting flange, J², through which are cut a series of segmental slots, d d, for the passage of the air from the space below the reverser-piston to the space above the same, or vice versa, said flange J² resting at its outer edge upon a suitable seat formed for the purpose in the upper end of the regenerator-cylinder.

Figures 4, 5, 6, 7, 8, 10, 11, 12:
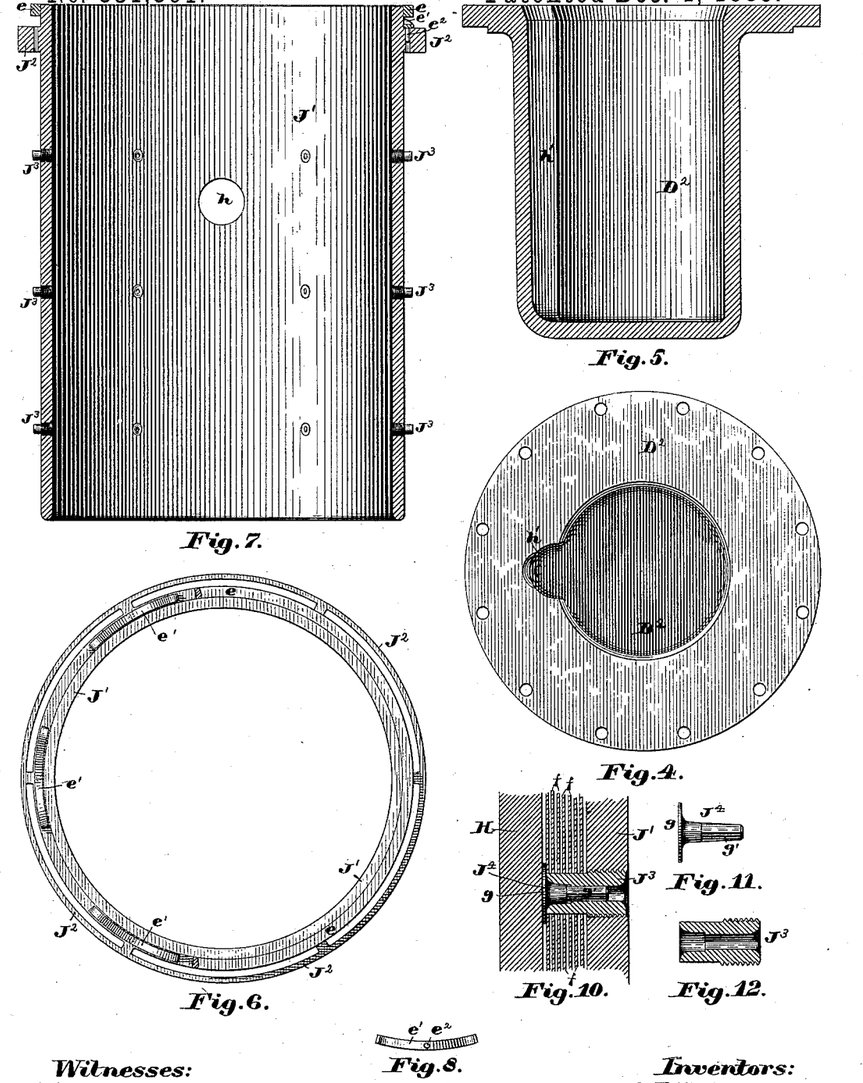
Figs. 4 and 5 are respectively a plan and a central vertical section of the heater for the working-cylinder.
Fig. 6 is a plan of the lower section of the displacer-cylinder and its packing-ring, a portion of the latter being broken away to show the springs beneath it.
Fig. 7 is a central vertical section of the same parts.
Figs. 8 and 9 are respectively an inverted plan and an elevation of one of the springs for operating the packing-ring at top of the lower section of the displacer-cylinder.
Fig. 10 is a vertical section through a portion of displacer-cylinder, and the regenerator-cylinder, and illustrating the manner of securing and supporting the regenerator-plates.
Figs. 11 and 12 are details illustrating the devices for supporting and securing the regenerator-plates, modifications being shown in Figs. 27 and 28.
Figure 5:
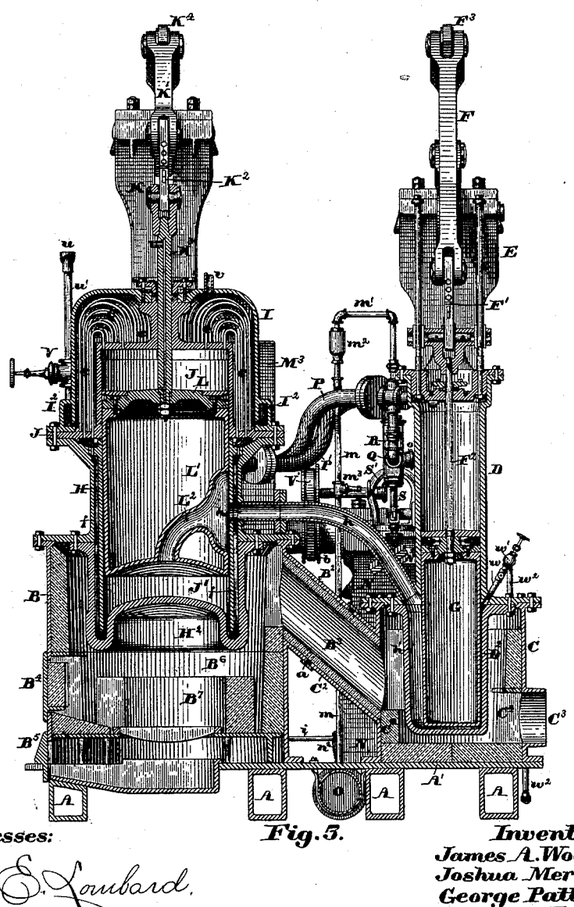
Figure 9:
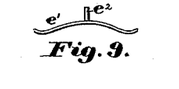
Figure 27:
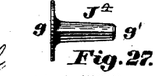
Figure 28:
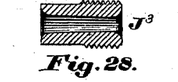

In said prior application the upper end of the lower section of the displacer-cylinder had formed therein an annular groove, in which was placed a packing-ring resting upon springs, which served to press its upper edge against the lower end of the upper section of said displacer-cylinder to make a tight joint and compensate for unequal expansion; but it has been found that such construction was objectionable, on account of said groove filling up with dust and other impurities carried into the machine with the air to such an extent as to cause the packing-ring to stick, and thus become practically inoperative. To obviate this objection, we now dispense with the groove in the upper end of the cylinder J' and place the packing-ring e outside of said cylinder and above the flange J², and place beneath said packing-ring e a series of leaf-springs, e', each provided with a shank, e², (see Figs. 8 and 9,) which enters a hole drilled through the flange J², as shown in Fig. 7. The space between the lower section, J', of the displacer-cylinder and the regenerator-cylinder and the outer wall of the heater is filled with thin sheet-brass plates f f, constructed and arranged substantially as described in Letters Patent No. 228,712, granted to us June 8, 1880. We have found by experience that these regenerator-plates need to be removed and cleaned at long intervals, and we have experienced considerable difficulty in so securing them in position as to render them always effective, and at the same time capable of being easily removable for cleaning. In another application, filed April 4, 1881, No. 29,908, we have shown and described a device for this purpose, consisting of a screw-stud set in the wall of the deflector or lower section of the displacer-cylinder and projecting radially therefrom, upon which said plates were supported, and to which they were secured by a screw having a thin flat head, which screwed into a threaded hole in said stud; but we have found that it was very difficult to remove said screws when it was desired to remove the plates for cleaning. To overcome this difficulty, we now make the studs J³ in the form of tubes, the opening through the same being made, preferably, of two different diameters, the outer portion for, say, about one-third of the length of the stud being made slightly tapering and of larger diameter than the inner portion, as shown in Figs. 10 and 12, and drill the holes into which said studs are to be screwed entirely through the wall of the cylinder, as shown in Fig. 10, said tubular studs and the pins to be driven therein being made of metal of different degrees of hardness. We make the fastening-pins $J^4$ with thin flat heads $g$ and tapered shanks, a portion at least of which at the ends opposite their heads are made square, the diameters of the square portions, measuring from corner to corner at the junctions of said square portions with the round portions, equal to the diameter of said round portions at such junction, while the diagonal diameters at the ends of said pins are about equal to the diameters of the smaller holes in the studs $J^3$. If desired, however, the holes through the studs $J^3$ may be made without shoulders and the shanks of the pins be made square throughout, as illustrated in Figs. 27 and 28. When the plates $f\,f$ are all placed in position on the tubular studs $J^3$, the pins $J^4$ are driven into said studs, as shown in Fig. 10, the corners of the square portions $g'$ cutting into the softer metal of the studs, thereby creating sufficient friction to retain them in position. When it is desired to remove the plate, the pins $J^4$ may be backed out from the interior of the cylinder in an obvious manner, and replaced at will.

We have also discovered by experiment that plates made from No. 2 brass or Muntz metal are much better adapted for use as regenerator-plates than iron or copper, for the reason that it is not as readily oxidized when subjected to the action of the heated air.

Both of the displacer-pistons L are provided with suitable packing-rings in their peripheries, to make them work air-tight in the displacer-cylinders J, and each has secured to its under side the hollow extension L', arranged to work in the lower section, J', of the displacer-cylinder without touching it, as described in said prior application. In our present machine the hollow extension L' of the piston L has formed therein the curved passage $L^2$, opening at one end through the center of the bottom of said extension and at the other end through its periphery, said latter opening being made oblong or having a vertical length equal to the stroke of said piston plus the diameter of the curved pipe $h$, which connects the interior of the displacer-cylinder with the interior of the heater or chamber beneath the working-piston G, so that the air may flow freely through the pipe $h$ and passage $L^2$ from the chamber beneath the working-piston G to the chamber beneath the displacer-piston, or vice versa, in whatever position the displacer-piston may be.

To the lower end of the working-cylinder D or D' is bolted the pendent heater $D^2$, in one side of which is formed the vertical semicircular groove or passage $h'$, (see Figs. 4 and 5,) so arranged that its upper end coincides with the end of the pipe $h$, for the purpose of permitting a free flow of air to and from the space below the working-piston G, regardless of the position of said cylinder.

Figure 1:
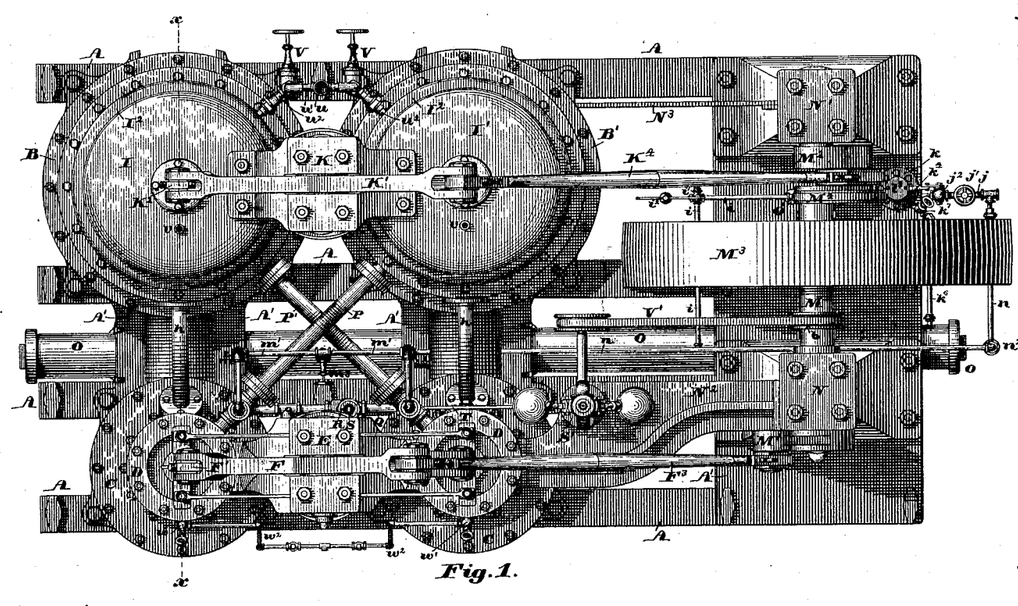
Figure 1 of the drawings is a plan of an engine embodying our invention.
Figure 21:
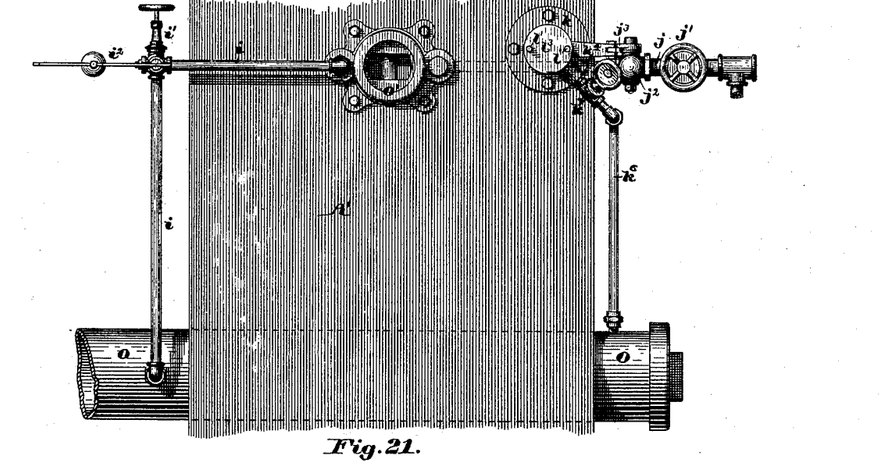
Fig. 21 is a plan of a portion of the bed-plate, a part of the reservoir, the air-pump, pipes connecting the pump and reservoir, and the pressure-regulating devices.
Figure 22:
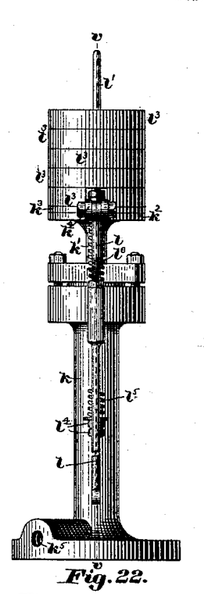
Fig. 22 is an elevation of a device for automatically regulating the pressure of air in the reservoir by causing said pressure to close or permit the opening of the valve through which air is supplied to the air-pump.
Figure 23:
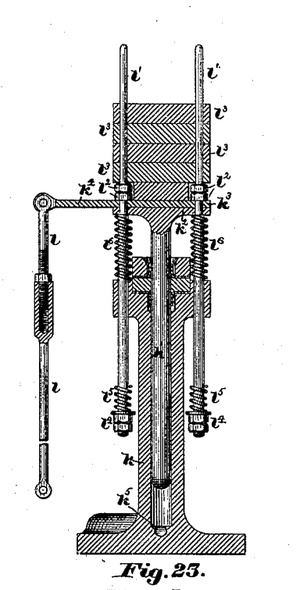
Fig. 23 is a vertical section of the same on line $v$ $v$ on Fig. 22.
Figures 24, 25:
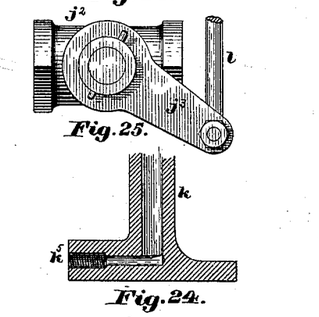
Fig. 24 is a vertical section of a portion of the lower end of the cylinder of said regulating device, the cutting-plane being through the center of the inlet-passage thereto.
Figs. 25 and 26 are respectively an elevation and a sectional plan of the regulating-cock for admitting air to the air-pump.
Figure 26:
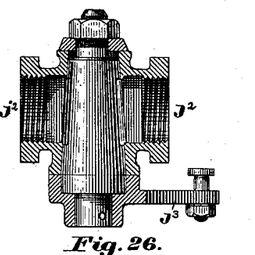

O is a cylindrical tank or reservoir located between the beams A A and beneath the plates A' A' A' of the bed-plate, and which may be charged with air at any desired pressure by means of the air-pump O', located upon the bed-plate directly beneath the shaft M, and connected to said reservoir by the pipe $i$, provided with the shut-off valve $i'$ and the safety-valve $i^2$, as a means of limiting the pressure that can be obtained in the reservoir. (See Fig. 21.) The plunger of the pump O' is operated by the eccentric $M^4$ in a well-known manner, and air is drafted by said pump through the pipe $j$, which is provided with a screw-valve, $j'$, for shutting off the supply of air by hand, and the pressure-regulating cock $j^2$, (see Figs. 25 and 26,) which is designed for automatically regulating the pressure in the reservoir in the following manner: An upright cylinder, $k$, closed at one end, and having a bore of small diameter, is firmly bolted to the bed-plate above the pipe $j$, in the bore of which is fitted the plunger $k'$, provided at its upper end with the disk-like plate $k^2$, to which is bolted another plate, $k^3$, provided with a radially-projecting arm, $k^4$, to the outer end of which is pivoted one end of the connecting-rod $l$, the opposite end of which is pivoted to the movable end of the lever $j^3$, mounted upon the end of the conical plug of the regulating-cock $j^2$, as shown in Figs. 21 and 25. The plates $k^2$ and $k^3$ are bolted together by means of the guide-rods $l'$ and the nuts $l^2$, said rods extending downward through bearings in the flange of the cylinder $k$, to serve as guides to prevent the plunger $k'$ turning in the cylinder. They also extend upward from said plates, to serve as guides to receive and hold the disk-weights $l^3\,l^3$, as shown in Figs. 22 and 23. The lower ends of the guide-rods $l'$ have mounted thereon the nuts $l^4$ and the spiral springs $l^5$, to limit their upward movement, and form an elastic stop therefor. Said rods are also provided with the spiral springs $l^6$ between the upper end of the cylinder $k$ and the plate $k^2$, to serve as elastic stops for said plunger in its downward movement. The base of the cylinder is provided with an inlet-passage, $k^5$, from which the pipe $k^6$, provided with the shut-off valve $k^7$, leads to the reservoir O, all as shown in Figs. 1 and 21. Air is supplied from the reservoir to the cylinders through the pipes $m\,m'$, check-valves $m^2$, and pipes P and P'. The pipe P connects the chamber in the upper end of the working-cylinder D, with the chamber in the lower end of one displacer cylinder, while the chamber in the lower end of the other displacer-cylinder is connected through the pipe P' with the chamber in the upper end of the working-cylinder D', substantially as described in the before-cited prior application.

The pipe $m$ is supplied with a valve or gate, $m^3$, by which the supply of air to the cylinders through the reservoir may be shut off.

In order to start the engine when there is no pressure above that of the common air in the reservoir and pump up the reservoir to the desired pressure, the valve $m^3$ is closed and air is admitted to the cylinders through the pipes $n$, $n'$, $m'$, P, and P' and the check-valves $m^2$ $m^2$ and $n^2$.

Q is the by-pass pipe, connected at one end with the pipe P and at its other end with the pipe P', thereby connecting all parts of the interiors of the several cylinders when said pipe Q is open or unobstructed by a closed valve, for the purpose of equalizing the pressure in the several cylinders and stopping the engine. The pipe Q is provided with a screw valve or gate, $o$, for the purpose of shutting off communication through said pipe when, for any reason, it is not desired to have said pipe operative.

In order to regulate the speed of the engine automatically, we insert in the pipe Q a regulating-valve of novel construction, (shown in Figs. 13, 15, 16, and 17,) the casing R of which is open at both ends and is provided with the short cylinder R', having near its lower end the enlargement or chamber $p$ and the seat $p'$. A passage, $R^2$, connects the lower end with the upper end of the cylinder R', and $R^3$ and $R^4$ are openings by which said casing is connected to and communicates with the pipe Q, as shown in Figs. 2 and 13.

Figures 13, 14, 15, 16, 17, 18, 19, 20:
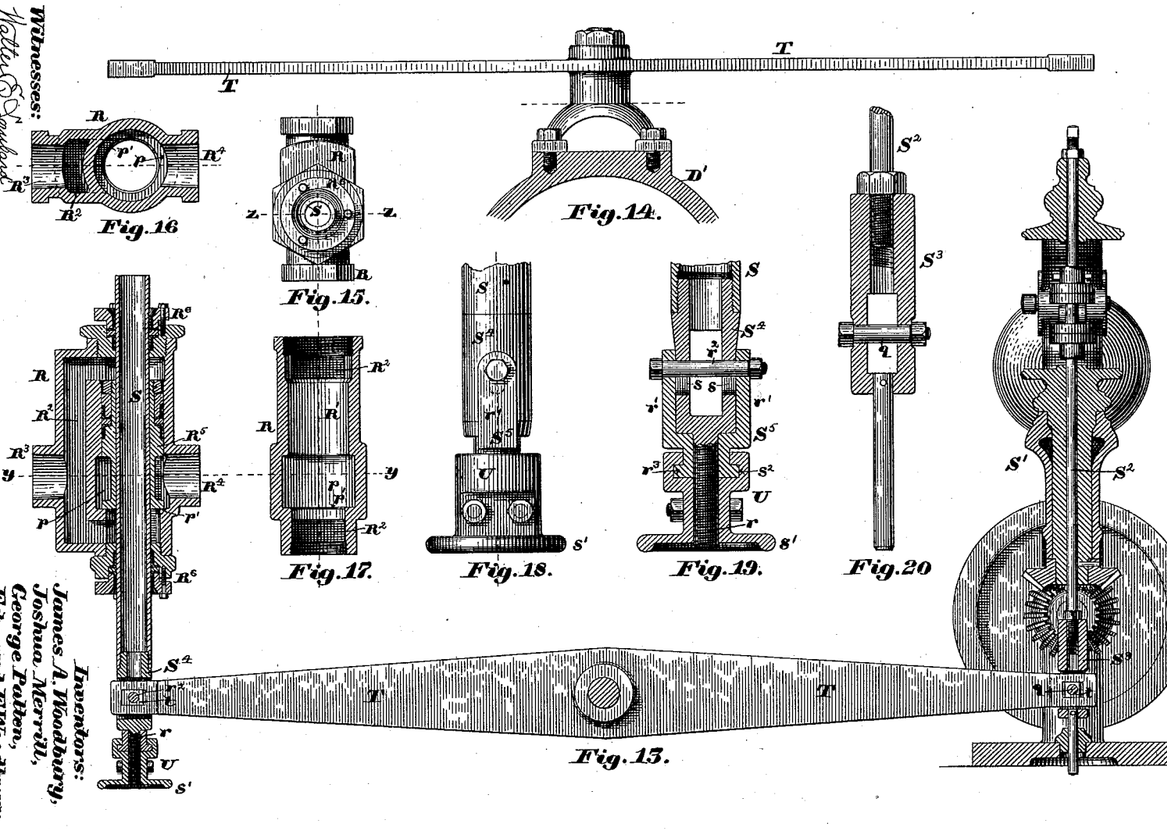
Fig. 13 is a vertical section through the governor and the valve for controlling the passage of air through the by-pass for regulating the engine, and showing the lever connecting said valve and governor in elevation.
Fig. 14 is a plan of said lever and its fulcrum pin or stand.
Fig. 15 is a plan of the by-pass valve.
Fig. 16 is a horizontal section of same on line $y$ $y$ on Fig. 13.
Fig. 17 is a vertical section of the same on line $z$ $z$ on Fig. 15.
Figs. 18 and 19 are respectively an elevation and central vertical section of the devices for connecting the governor-lever to the by-pass valve and for operating said valve by hand.
Fig. 20 is a vertical section of the device for connecting the valve-operating lever to the vertically-reciprocating rod or stem of the governor.

Within the cylinder R' is fitted the piston-valve $R^5$, suitably packed, so as to move air-tight within the upper part of said cylinder, and arranged to rest upon the seat $p'$, and having a portion just above the valve-disk which rests upon said seat reduced in diameter, said piston-valve being secured upon the spindle S, preferably made hollow or in the form of a tube, to reduce its weight, and mounted in bearings in the packing-boxes $R^6$ at each end of the casing R, as shown in Fig. 13. The arrangement of this valve in the by-pass pipe Q is such that the greater pressure is some times upon the two ends of the piston-valve $R^5$ and at other times upon the shoulders formed by the reduction in diameter just above the disk that rests upon the seat $p'$.

To operate the piston-valve $R^5$ automatically and permit the passage of air through the valve-casing R in either direction, according as the pressure is greatest in one pair of cylinders or in the other, to vary the speed of the engine, we mount the governor S' upon the tie-girt $N^2$, attach to the vertically-movable spindle $S^2$ of said governor the stirrup $S^3$, (see Figs. 13 and 20,) to which is pivoted by the pin $q$ one end of the lever T, mounted by the middle of its length upon a fulcrum-pin secured to the side of the working-cylinder D', and pivot the other end of the lever T to the stirrup $S^4$, secured to the lower end of the tubular spindle S. (See Figs. 13 and 19.) By means of this arrangement of the governor, the lever T, and the nearly perfectly balanced valve $R^5$, the speed of the engine may be perfectly controlled, as the moment the engine begins to run too fast the action of the balls of the governor causes the spindle $S^2$, stirrup $S^3$, and the end of the lever T, attached thereto, to be depressed and the opposite end of said lever and the valve $R^5$ to be raised, thus permitting a portion of air to pass from that side of said valve where the pressure is greatest to the side where the pressure is least at that moment, the result of which is to instantly check the speed of the engine by virtue of the partial equalization of the pressure thus produced. The stirrup $S^4$ is provided with the threaded pendent stem $r$, upon which is fitted so as to slide freely thereon the short sleeve $S^5$, provided with the two ears $r'$ $r'$, arranged to embrace or receive between them the body of the stirrup $S^4$, and having set therein the pin $r^2$, which passes through slots $s$ $s$ in the stirrup $S^3$, so as to permit a limited vertical movement of the valve $R^5$ and spindle S independently of the movement of the lever T, as shown in Figs. 18 and 19. A threaded nut, U, made in two parts bolted together and provided at one end with the milled head or hand-wheel $s'$ and at its other end with a chambered socket, $s^2$, is fitted to inclose the collar or flange $r^3$, formed upon the lower end of the sleeve $S^5$, so that said nut U may be revolved upon the stem $r$ without revolving the sleeve, and so that the sleeve $S^5$ must move up and down with the nut U when it is revolved upon the stem $r$. By means of this hand-nut U we are enabled to stop the engine almost instantly by opening the valve $R^5$ and allowing the pressure to be completely equalized in all the cylinders. The lever T is provided at each end with a sliding box, $t$, through which the pins $q$ and $r^2$ pass, as shown in Fig. 13. The cooling-chambers are supplied with cold water through the annular chambers $I^2$, surrounding the lower ends of the cooler-casings I and I', and a series of small holes formed in the bottom of the partitions between the cooling-chambers and said annular water-chambers $I^2$, as shown in Fig. 3. The water is supplied to the annular chambers $I^2$ by means of a suitable water-pump, (not shown,) the pipe from which connects at $u$ with the pipe $u'$, through which and the valves V V and pipes $u^2$ the water flows into said chambers, and after performing its duty in the cooling-chamber is discharged through the pipes $v$ $v$. (Shown in Figs. 1 and 3.) The governor is operated from the pulley $b$ by the belt V' in a well-known manner. A pipe, $w$, is set in each working-cylinder at the angle of its lower flange, so as to communicate with the interior of its heater, and is provided with a valve or gate, $w'$, through which and the pipes $w^2$ the compressed air may be blown off to reduce the pressure to that of common air whenever desired.

What we claim as new, and desire to secure by Letters Patent of the United States, is—

1. The combination of the furnace-casings B and C, connected by an inclined pipe or passage opening from the casing B at its upper end or opposite the vertical wall of the heater and communicating with the interior of the casing C at or near the center of its length, substantially as described.

2. The combination of the regenerator-cylinder, the upper and lower sections, J and J', of the displacer-cylinder, the flange $J^2$, projecting outward from the section J', the packing-ring $e$, surrounding said section J' above the flange $J^2$, and the springs $e'$, substantially as described.

3. The displacer-piston L L', provided with the curved passage $L^2$, constructed and arranged substantially as and for the purposes described.

4. The working-cylinder heater $D^2$, provided with the semicircular groove or passage $h$, substantially as described.

5. As a means of securing the regenerator-plates in position, a series of tubular screw-studs set in the displacer-cylinder, in combination with a series of pins having thin flat heads and tapering shanks or bodies applied thereto, substantially as and for the purposes described.

6. The combination, in an air-engine, of a reservoir arranged and adapted to receive and hold air under pressure, a pump for forcing air into said reservoir, a regulating valve or cock placed in the supply-pipe to said pump, a cylinder having communication with said reservoir, a plunger-piston fitted to said cylinder and adapted to be raised by the pressure of air admitted to said cylinder, a rod connecting said piston with the regulating valve or cock, and a series of removable weights carried by said piston, all arranged and adapted to operate substantially as and for the purposes described.

7. In combination with the cylinders of an air-engine and a by-pass pipe connecting the chambers upon the opposite sides of the pistons working therein, the speed regulating valve R, having a vertically-moving spindle, the lever T, connected to said spindle by a pin-and-slot connection, and a governor connected to the opposite end of said lever, substantially as described.

8. In combination with the two displacer-cylinders of an air engine and a by-pass pipe connecting the same, the valve-casing R, the valve $R^5$, the spindle S, the lever T, and governor S', all constructed, arranged, and adapted to operate substantially as and for the purposes described.

9. In combination with the two displacer-cylinders of an air-engine and a by-pass pipe connecting their interiors, the valve-casing R, the valve $R^5$, mounted upon the spindle S, the slotted stirrup $S^3$, provided with the threaded stem $r$, the sleeve $S^5$, provided with the ears $r'$ $r'$, and the flange or collar $r^3$, the pin $r^2$, mounted in the ears $r'$ $r'$ and passing through slots $s$ $s$ in the stirrup $S^3$, and the hand-nut U, all constructed, arranged, and adapted to operate substantially as and for the purposes described.

In testimony whereof we have signed our names to this specification, in the presence of two subscribing witnesses, on this 27th day of March, A. D. 1885.

JAMES A. WOODBURY.
  JOSHUA MERRILL.
  GEORGE PATTEN.
  EDWARD F. WOODBURY.

Witnesses:
 WALTER E. LOMBARD,
 FRANK E. BRAY.